United States Patent
Han et al.

(10) Patent No.: US 9,979,485 B2
(45) Date of Patent: May 22, 2018

(54) METHOD AND APPARATUS FOR CANCELLING INTERFERENCE NOISE IN OPTICAL COMMUNICATION SYSTEM

(71) Applicant: INDUSTRY-ACADEMIC COOPERATION FOUNDATION, YONSEI UNIVERSITY, Seoul (KR)

(72) Inventors: Sang Kook Han, Seoul (KR); Hyoung Joon Park, Seoul (KR)

(73) Assignee: INDUSTRY-ACADEMIC COOPERATION FOUNDATION, YONSEI UNIVERSITY, Seoul (KR)

(*) Notice: Subject to any disclaimer, the term of this patent is extended or adjusted under 35 U.S.C. 154(b) by 0 days. days.

(21) Appl. No.: 15/628,831

(22) Filed: Jun. 21, 2017

(65) Prior Publication Data
US 2017/0373758 A1    Dec. 28, 2017

(30) Foreign Application Priority Data
Jun. 23, 2016  (KR) .................. 10-2016-0078634

(51) Int. Cl.
  *H04B 10/2575*  (2013.01)
  *H04B 15/00*  (2006.01)
(52) U.S. Cl.
  CPC ....... *H04B 10/25753* (2013.01); *H04B 15/00* (2013.01)
(58) Field of Classification Search
  CPC ..................... H04B 10/25753; H04B 15/00
  (Continued)

(56) References Cited

U.S. PATENT DOCUMENTS

| 2005/0041972 A1* | 2/2005 | Kim | ............... | H04J 14/02 398/78 |
| 2007/0133987 A1* | 6/2007 | Xu | ............... | H04B 10/40 398/67 |

(Continued)

FOREIGN PATENT DOCUMENTS

| KR | 10-2006-0042857 A | 5/2006 |
| KR | 10-2013-0093737 A | 8/2013 |

(Continued)

OTHER PUBLICATIONS

Sang-Min Jung et al., "Optical beat interference noise reduction by using out-of-band RF clipping tone signal in remotely fed OFDMA-PON link", Optics Express, vol. 22, No. 15, pp. 18246-18253, Jul. 21, 2014.

(Continued)

*Primary Examiner* — Dalzid Singh
(74) *Attorney, Agent, or Firm* — Sughrue Mion, PLLC (57) ABSTRACT

The present invention discloses an apparatus and method for cancelling interference noise in an optical communication system. According to an embodiment of the present invention, an apparatus for cancelling interference noise in an optical communication system in accordance with an embodiment of the present invention comprising: a communication unit for receiving first signals including baseband signals and radio frequency tone signals from at least two subscriber terminals and for detecting a second signal in which the first signals are combined; and a control unit for extracting a first interference noise generated around the radio frequency tone signals from the second signal and for cancelling a second interference noise generated around baseband signals using the first interference noise from the second signal.

19 Claims, 8 Drawing Sheets

(58) Field of Classification Search
USPC .......................................................... 398/115
See application file for complete search history.

(56) References Cited

U.S. PATENT DOCUMENTS

2015/0280816 A1* 10/2015 Al-Banna .......... H04B 10/2575
　　　　　　　　　　　　　　　　　　　　　398/26
2015/0326321 A1* 11/2015 Cho .................... H04B 10/556
　　　　　　　　　　　　　　　　　　　　　398/187
2016/0294473 A1* 10/2016 Alrutz ................ H04B 10/2507

FOREIGN PATENT DOCUMENTS

| KR | 10-1396239 B1 | 5/2014 |
| KR | 10-2014-0081910 A | 7/2014 |
| KR | 10-1448383 B1 | 10/2014 |

OTHER PUBLICATIONS

Communication dated Mar. 15, 2018, issued by the Korean Patent Office in counterpart Korean Patent Application No. 10-2016-0078634.

* cited by examiner

METHOD AND APPARATUS FOR CANCELLING INTERFERENCE NOISE IN OPTICAL COMMUNICATION SYSTEM

CROSS-REFERENCE TO RELATED APPLICATION

This application claims the priority benefit of Korean Patent Application No. 10-2016-0078634, filed on Jun. 23, 2016 in the Korean Intellectual Property Office, the disclosure of which is incorporated herein by reference.

BACKGROUND OF THE DISCLOSURE

Field of the Disclosure

The present invention relates to an apparatus and method for cancelling interference noise in an optical communication system.

Description of the Related Art

A passive optical network (PON) is a system capable of transmitting and receiving optical signals from an optical line terminal (OLT) to a plurality of subscriber terminals.

For example, a subscriber terminal may be referred to as an optical network unit (ONU).

In a PON system, when a plurality of subscriber terminals transmit uplink signals to an optical line terminal, each subscriber terminal transmit a signal over a different frequency with the same wavelength using a frequency allocation scheme for multiplexing between subscriber terminals to an optical line terminal, the optical line terminal can flexibly allocate frequency bands to the subscriber terminals, thereby enabling efficient signal transmission.

When a plurality of subscriber terminals transmit a plurality of optical signals to an optical line terminal, optical interference noise may be generated in a photodiode (PD) of the optical line terminal.

For example, optical interference noise may be referred to as optical beat interference (OBI) noise.

OBI noise is generated around the baseband and is present in the signal band. OBI noise reduces the signal-to-noise ratio of the signal, thereby reducing the signal transmission performance of the PON system. Therefore, implementation of the OBI noise control technique is essential.

OBI noise controlling techniques includes an optical carrier suppression method, an optical carrier broadening method using a radio frequency tone, and a wave allocation method.

The optical carrier elimination method cancels the optical carriers of the optical signals through a sharp optical filter and injects one optical carrier, so that there is a limitation that an additional filter is required.

The optical carrier broadening method is that the line width of the optical carrier is broaden by modulating a radio frequency tone signal together with an optical carrier, so that the OBI noise spreads lowly and widely in the frequency band, thereby improving the signal performance.

However, the optical carrier broadening method does not fundamentally cancel the OBI noise, includes a problem that the signal performance decreases as the frequency band is expanded.

The wavelength allocation method includes the problem that when the subscriber terminals transmit optical signals to the optical line terminal, they use different frequencies such as wavelength division multiplexing (WDM) instead of using the same wavelength, thereby wasting frequency.

RELATED DOCUMENTS

Patent Documents

Korean Patent Application Publication No. 10-2006-0042857, entitled "OPTICAL RECEIVER FOR REDUCING OPTICAL BEAT INTERFERENCE, AND OPTICAL NETWORK THE SAME"

Korean Patent Application Publication No. 10-2014-0081910, entitled "INTERFEROMETRIC NOISE SUPPRESSION APPARATUS AND OPTICAL COMMUNICATION SYSTEM COMPRISING THE SAME"

Korean Patent Registration No. 10-1448383, entitled "OPTICAL COMMUNICATION SYSTEM FOR REDUCING RAYLEIGH BACKREFLECTION NOISE BY USING A RF TONE"

SUMMARY OF THE DISCLOSURE

According to an embodiment of the present invention, an apparatus and method for cancelling interference noise in an optical communication system can be provided.

According to an embodiment of the present invention, an apparatus and method to extract an interference noise formed around radio frequency tone signal as receiving a signal including a baseband signal and radio frequency tone signals in an optical communication system can be provided.

According to an embodiment of the present invention, an apparatus and method to extract an interference noise generated around radio frequency tone signals in an optical communication system, and to cancel an optical beat interference (OBI) noise of a signal received from subscriber terminal using the extracted interference noise can be provided.

An apparatus for cancelling interference noise in an optical communication system according to an embodiment of the present invention comprises a communication unit for receiving first signals including baseband signals and radio frequency tone signals from at least two subscriber terminals and for detecting a second signal in which the first signals are combined; and a control unit for extracting a first interference noise generated around the radio frequency tone signals from the second signal and for cancelling a second interference noise generated around the baseband signals using the first interference noise from the second signal.

A method for cancelling interference noise in an optical communication system according to an embodiment of the present invention comprises receiving first signals including a baseband signal and radio frequency tone signals from at least two subscriber terminals and detecting a second signal to which the first signals are combined; extracting a first interference noise generated around the radio frequency tone signals from the second signal; and cancelling a second interference noise generated around the baseband signals from the second signal using the first interference noise.

The apparatus for cancelling interference noise in an optical communication system according to an embodiment of the present invention can compose as hardware without additional optical elements and provide flexibility in signal process by cancelling the noise of optical signals after optical detection.

BRIEF DESCRIPTION OF THE DRAWINGS

The above and other objects, features and other advantages of the present invention will be more clearly under

DETAILED DESCRIPTION OF THE DISCLOSURE

Hereinafter, various embodiments of the present document will be described with reference to the accompanying drawings. It is understood that the embodiments and terminologies used herein are not intended to limit the techniques described in this document to specific embodiments, but rather to include various modifications, equivalents, and/or alternatives of the embodiments.

In the following description, well-known functions or constructions are not described in detail since they would obscure the invention in unnecessary detail.

It is understood that both the foregoing general description and the following detailed description of the present invention are exemplary and explanatory and are intended to provide further explanation of the invention as claimed. Therefore, the definition should be based on the contents throughout this specification.

In the context of the description of the drawings, similar reference numerals may be used for similar elements.

The singular expressions may include plural expressions unless the context clearly dictates otherwise.

In this document, the expressions "A or B "or "at least one of A and/or B" and the like may include all possible combinations of the items listed together.

Expressions such as "the 1," "the 2," "the first," or "the second," and the like, may qualify the components irrespective of order or importance and may be used to distinguish one component from another, but is not limited to those components.

When it is mentioned that some (e.g., the first) component is "(functionally or communicatively) connected" or "accessed to" another (e.g., the second) component, it may be directly connected to the component, or may be connected through another component (e.g., the third component).

In this specification, as herein" is intended to configured to" is used to do interchangeably all types of information, including, for example, with hardware or software, "suitable for ~", "capable of ~", "changed to ~", "made to ~", or "designed to ~"

In some situation, the phrase "configured to ~" can also mean the device "capable of ~" with the device, other device or components.

For example, the phase "a processor composed (or configured) to perform A, B, and C" may mean a general purpose processor (e.g., a CPU or an application processor) capable of performing the corresponding operations by executing one or more software programs stored in a memory device or a dedicated processor (e.g., an embedded processor).

The apparatus described above may be implemented as a hardware component, a software component and/or a combination of hardware components and software components.

For example, the apparatus and components described in the embodiments may be implemented by using one or more general purpose or special purpose computers, such as a processor, a controller, an arithmetic logic unit (ALU), a digital signal processor, a microcomputer, a field programmable array (FPA), programmable logic unit (PLU), microprocessor, or any other device capable of executing and responding to instructions.

The processing device may execute an operating system (OS) and one or more software applications running on the operating system.

In addition, the processing device may access, store, manipulate, process, and generate data in response to execution of the software.

Hereinafter, for ease of understanding, it is sometimes assumed that one processing apparatus is used, but those skilled in the art will recognize that the processing apparatus may have a plurality of processing elements and/or a plurality type of processing elements.

For example, the processing apparatus may comprise a plurality of processors or one processor and one controller. Other processing configurations are also possible, such as a parallel processor.

The software may comprise a computer program, code, instructions, or a combination of one or more of the foregoing, and may configure the processing device to operate as desired, or can command collectively process device.

Software and/or data may be embodied permanently or temporarily on any type of machine, component, physical device, virtual equipment, computer storage media, or device, signal wave being transmitted to analysis by processing device or to provide instruction or date.

The software may be distributed over a networked computer system and stored or executed in a distributed manner. The software and data may be stored on one or more computer readable media.

Figure 1:
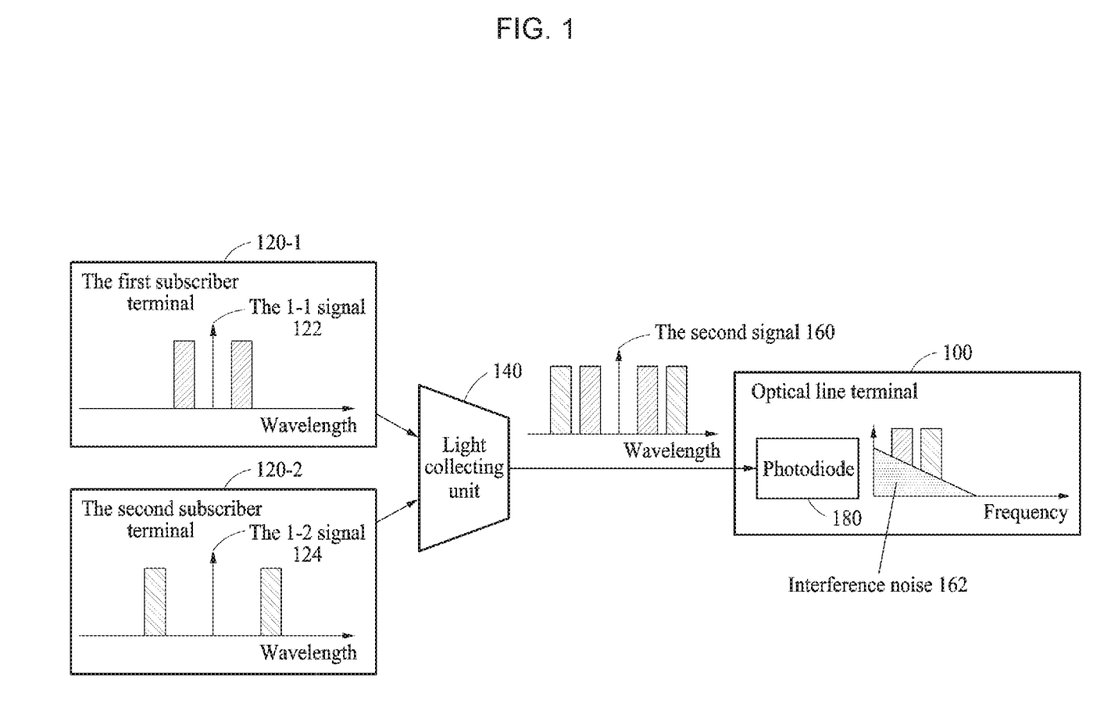
- FIG. 1 illustrates a signaling procedure in an optical communication system according to an embodiment of the present invention.

FIG. 1 illustrates a signaling procedure in an optical communication system according to an embodiment of the present invention.

Specifically, FIG. 1 illustrates that a first subscriber terminal 120-1 and a second subscriber terminal 120-2 transmit signals to the optical line terminal 100 using a single wavelength in the optical communication system.

Referring to FIG. 1, the first subscriber terminal 120-1 and the second subscriber terminal 120-2 transmit respectively the 1-1 signal 122 and the 1-2 signal 124 using the same wavelength.

The 1-1 signal 122 and the 1-2 signal 124 are coupled to the second signal 160 by the light collecting unit 140. The optical line terminal 100 receives the second signal 160.

The 1-1 signal 122 and the 1-2 signal 124 may include a baseband signal and a radio frequency tone signal, respectively. Here, the baseband signal may be a carrier wave containing data. For example, the radio frequency tone signal may be referred to as a radio frequency signal.

For example, the 1-1 signal 122 and the 1-2 signal 124 that the first subscriber terminal 120-1 and the second subscriber terminal 120-2 transmits to the optical line terminal 100, may be an uplink signal.

For example, mutually identical wavelengths may be referred to as a single wavelength. For example, signals transmitted by the first subscriber terminal 120-1 and the second subscriber terminal 120-2 may be light including data.

For example, data may be referred to as a source. For example, the first subscriber terminal 120-1 and the second subscriber terminal 120-2 transmit a light using a laser diode (LD) or a reflective semiconductor optical amplifier (RSOA).

Optical elements such as laser diodes or reflective semiconductor optical amplifiers are hard to accurately oscillate with the same wavelength and also change the refractive index of the gain medium depending on the magnitude and temperature of the bias current, thereby the central wavelength of the light outputted from the optical element is continuously changed with time.

The optical line terminal 100 detects the second signal 160 through a photodiode. The second signal 160 includes the 1-1 signal 122 and the 1-2 signal 124.

For example, the photodiode may be located in the communication unit of the optical line terminal 100. For example, photodiodes may be referred to photo detectors, and photo detecting devices.

When the second signal 160 is detected through the photodiode, the 1-1 signal 122 and the 1-2 signal 124 included in the detected second signal 160 have the same wavelength, it is possible to generate the interference noise 162 that causes mutual interference according to the wavelength difference of optical carrier.

For example, the interference noise 162 may be optical beat interference (OBI) noise.

Due to the optical carrier wavelength difference between the first subscriber terminal 120-1 and the second subscriber terminal 120-2, an optical interference noise 162 may occur interference noise 162, as optical interference noise at a photodiode using the square-law detection method of the optical line terminal 100.

Interference noise 162 is generated largely near the baseband of the 1-1 signal 122 and the 1-2 signal 124 and exists in the signal band.

As the interference noise 162 reduces the signal to noise ratio (SNR) of the signal transmitted by the first subscriber terminal 120-1 and the second subscriber terminal 120-2, a efficiency of transmission signal of the first subscriber terminal 120-1 and the second subscriber terminal 120-2 is decreased.

Figure 2:
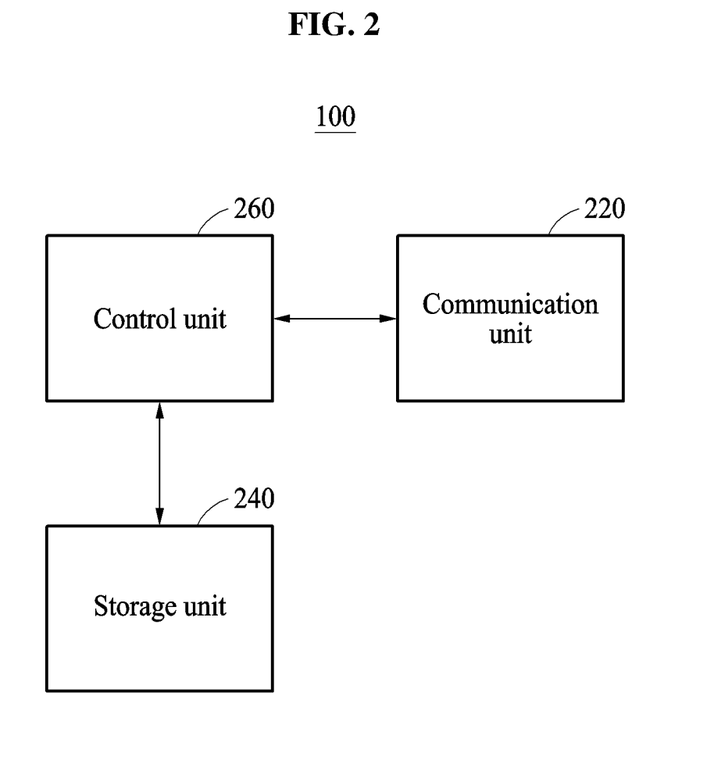
FIG. 2 illustrates a block diagram of an optical line terminal according to an embodiment of the present invention.

FIG. 2 shows a block diagram of an optical line terminal according to an embodiment of the present invention.

FIG. 2 illustrates components of the optical line terminal 100.

The terms 'part', 'unit' and the like used below are used to denote at least one unit for processing a function or an operation, and may be implemented by hardware, software, or a combination of hardware and software. For example, optical line terminal 100 may be referred to as an optical line terminal (OLT).

Referring to FIG. 2, the optical line terminal 100 includes a communication unit 220, a storage unit 240, and a control unit 260.

For example, the optical line terminal 100 may be a central base station device. For example, the optical line terminal 100 may be referred to as an apparatus for cancelling interference noise.

For example, the optical line terminal 100 may be a part of an optical network, and may be an optical terminal of a service provider.

For example, the optical line terminal 100 is a multi-service device for connecting an optical network terminal to another system, and may be referred as a service interface and protocol processing (SIPP) device, a cable television (CATV) Device, a transmitting device, and a network management device.

The communication unit 220 may include an optical receiving unit and an optical transmitting unit.

The optical receiving unit receives an optical signal transmitted from a plurality of subscriber terminals, converts the received optical signal into an electric signal, and amplifies the converted electric signal.

For example, the optical receiving unit receives an optical signal, includes the photodiode converting the received optical signal into an electrical signal and an amplifier that amplifies the converted signal.

The optical transmitting unit may convert an electrical signal into an optical signal and transmit the converted optical signal to a plurality of subscriber terminals.

In addition, the communication unit 220 performs a function of converting between a baseband signal and a bit string according to a physical layer standard of the system.

For example, the communication unit 220 generates complex symbols by encoding and modulating a transmission bit stream during data transmission.

In addition, the communication unit 220 demodulates and decodes the baseband signal upon receiving the data, and restores the received bit stream.

For example, at the time of data transmission, the communication unit 220 generates complex symbols by encoding and modulating transmission bit streams.

Also, upon receiving the data, the communication unit 220 demodulates and decodes the baseband signal to recover the received bit stream.

Also, after the communication unit 220 up-converts the baseband signal into a radio frequency (RF) band signal, transmits the signal through an antenna, and down-converts the RF band signal received through the antenna into a baseband signal.

For example, the communication unit 220 may include a transmission filter, a reception filter, an amplifier, a mixer, an oscillator, a digital to analog converter (DAC), an analog to digital converter (ADC) and the like.

In addition, the communication unit 220 may include different communication modules for processing signals of different frequency bands.

For example, various communication standards can be included Bluetooth low energy (BLE), Wireless Fidelity (Wi-Fi), WiGig (WiFi Gigabyte), cellular networks (e.g., Long Term Evolution) and the like.

Also, different frequency bands may include super high frequency (SHF) (e.g., 2.5 GHz, 5 GHz) and millimeter wave (e.g., 60 GHz) bands.

The communication unit 220 may include a distributor. For example, the distributor connects the optical line terminal 100 and a plurality of subscriber terminals.

The distributor can distribute a signal transmitted from the optical line terminal 100 to a plurality of subscriber terminals. For example, the distributor refers to a device that is capable of switching on an optical line basis without optical-to-optical conversion in the optical network.

It is mainly exchanged between large capacity systems, and the circuit exchange can be performed irrespective of the digital frame format of the input signal. The optical path can be reset by using the bypass transfer function or the network restoration function even when the service is impossible due to the failure between adjacent nodes. For example, the distributor may be referred to as a splitter.

The communication unit 220 transmits and receives signals as described above. Accordingly, the communication unit 220 can be referred to as a transmitting unit, a receiving unit, or a transmitting/receiving unit.

In the following description, transmission and reception performed through the optical communication channel or the wireless channel are used to mean that the processing is performed by the communication unit 220 as described above.

The communication unit 220 according to an embodiment of the present invention allocates time slots to each subscriber terminal using a downlink frame to support uplink communication of a plurality of subscriber terminals.

For example, the communication unit 220 requests a serial number to each subscriber unit, and receives the requested serial number. For example, a serial number may be received with a PLOAM (physical layer operations administration and maintenance) message.

The communication unit 220 can perform the registration procedure of the subscriber unit by giving an identity (ID) to each subscriber unit referring to the serial number.

For example, the DL frame may include a synchronization signal field, a frame counter field, a downlink physical synchronization field including a passive optical network-identity (PON-ID) field for identifying the optical line terminal, and a payload.

In addition, the communication unit 220 according to an exemplary embodiment of the present invention may be connected to a plurality of subscriber terminals. The communication unit 220 can receive optical signals from a plurality of subscriber terminals.

The communication unit 220 can receive an optical signal from a plurality of subscriber terminals through different frequencies.

When the communication unit 220 receives optical signals from a plurality of subscriber terminals, it may be referred to as uplink communication.

When the communication unit 220 transmits optical signals to a plurality of subscriber terminals, it may be referred to as downlink communication.

The optical signal transmitted or received by the communication unit 220 may include data. For example, data contained in an optical signal may be referred to as a source.

In addition, the communication unit 220 according to an exemplary embodiment of the present invention may include a photodiode. The photodiode can convert an optical signal transmitted from a plurality of subscriber terminals into an electrical signal.

For example, the photodiode may be referred to as a photo detector. The optical detecting unit can detect data included in the optical signal. For example, the communication unit 220 may include a light emitting diode.

The light emitting diode may emit an optical signal that is transmitted to a plurality of subscriber terminals. For example, the light emitting diode may be referred to as an optical output unit. The optical output unit may be an element outputting optical. For example, the optical output by the optical output unit may be a continuous wave laser (CW laser).

The communication unit 220 according to an embodiment of the present invention may include a modulation unit. For example, the modulation unit can generate an optical signal by modulating the light outputted from the optical output unit to a subcarrier.

The communication unit 220 according to an embodiment of the present invention may include a distribution unit. For example, the distribution unit may distribute the optical signal and transmit optical signals to a plurality of subscriber terminals.

The communication unit 220 according to an exemplary embodiment of the present invention may receive the first signals including a baseband signal and a radio frequency tone signal from two or more subscriber terminals.

The communication unit 220 according to an embodiment of the present invention can detect the second signal in which the first signals are combined.

The optical line terminal receives the second signal by combing in the optical collecting unit the first signals received from the subscriber terminals.

The communication unit 220 according to an embodiment of the present invention can receive an optical carrier from a plurality of subscriber terminal. For example, the communication unit 220 can receive an optical carrier transmitted through a same wavelength from a plurality of subscriber terminals.

The storage unit 240 stores data such as a basic program, an application program and setting information for operating the optical line terminal 100.

In particular, storage 240 may store at least one set of instructions (e.g., applications) for managing files in accordance with various embodiments.

At least one instruction set stored in the storage unit 240 may executed by the control unit 260.

The storage unit 240 provides the stored data according to the request of the control unit 260. The storage unit 240 is included in the optical line terminal 100 and may be referred to as an 'internal storage' or an 'internal storage device'.

The control unit 260 may control the operation of the communication unit 220 and the storage unit 240.

The control unit 260 may include a processor, a central processing unit, an application processor, or a communication processor.

For example, the control unit 260 can perform operations and data processing relating to control and/or communication of at least one other component of the optical line terminal 100.

For example, the control unit 260 may control a plurality of hardware or software components connected to the control unit 260 by driving an operating system or an application program, and may perform various data processing and calculations.

For example, the control unit 260 may be implemented as a system on chip (SOC). The control unit 260 may load and process the command or data received from at least one of the other components (e.g., non-volatile memory) into the volatile memory and store the resulting data in the non-volatile memory.

The control unit 260 controls the overall operation of the optical line terminal 100. The control unit 260 may control the overall operations of the communication unit 220 and the storage unit 240.

For example, the control unit 260 transmits and receives optical signals through the communication unit 220. Also, the control unit 260 writes data to the storage unit 240 and reads the data.

To this end, the control unit 260 may include at least one processor or a microprocessor, or may be part of the processor.

In particular, the control unit 260 can control various operations of the optical line terminal 100 that transmit or receive an optical signal according to various embodiments described below.

The control unit 260 according to an embodiment of the present invention may control the communication unit 220 to receive the first signals including a baseband signal and a radio frequency tone signal from at least two subscriber terminals.

For example, the first signals may be received from the at least two subscriber terminals over the same or a single wavelength.

For example, radio frequency tone signals may change in the same way as changes in the first signals. For example, the radio frequency tone signal and the first signal may include the same frequency variation characteristic.

The controller 260 according to an embodiment of the present invention may extract the first interference noise generated around the radio frequency tone signals from the second signal.

In addition, the control unit 260 may cancel the second interference noise of the first signals from the second signal using the first interference noise.

The control unit 260 according to an exemplary embodiment of the present invention extracts a first interference noise generated around the radio frequency tone signals included in the first signal, performs frequency down-converting for the extracted first interference noise, adjusts the power level of the down-converted first interference noise, and cancels a second interference noise generated around the baseband signals from the second signal using the first interference noise.

The second interference noise may be generated in the baseband of the first signals when the first signals are transmitted through the same wavelength and received by the optical line terminal 100.

The control unit 260 according to an embodiment of the present invention can amplify the power of the first interference noise by amplifying the power level of the first interference noise. In addition, the control unit 260 may reduce the power of the first interference noise by reducing the power level of the first interference noise.

The control unit 260 may uniformly cancel the second interference noise using the first interference noise by using the overlapping characteristic of the first interference noise and the second interference noise according to an embodiment of the present invention.

For example, the control unit 260 can control the optical line terminal 100 to perform the procedure shown in FIGS. 4, 5, 6, 7, and so on.

Figure 3:
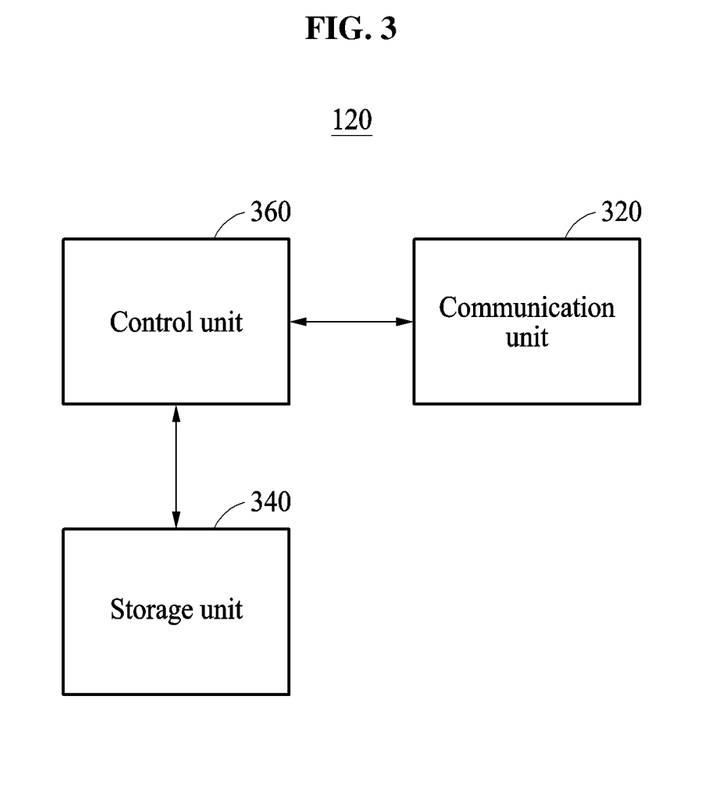
FIG. 3 illustrates a block diagram of a subscriber terminal according to an embodiment of the present invention.

FIG. 3 shows a block diagram of a subscriber terminal according to an embodiment of the present invention.

FIG. 3 illustrates a configuration of a subscriber terminal 120 according to an embodiment of the present invention. For example, a subscriber terminal may be referred to as a subscriber terminal. For example, the subscriber terminal 120 may be referred to as an optical network unit (ONU).

FIG. 3, the subscriber terminal 120 includes a communication unit 320, a storage unit 340, and a control unit 360.

The communication unit 320 performs functions for transmitting and receiving signals through an optical communication channel. For example, the communication unit 320 may include an optical receiving unit and an optical transmitting unit.

The optical receiving unit receives the optical signal transmitted from the optical line terminal, converts the received optical signal into an electric signal, and amplifies the converted electric signal.

For example, the optical receiving unit may include a photodiode that receives an optical signal, converts the received optical signal into an electrical signal, and an amplifier that amplifies the converted signal.

The optical transmitter may convert an electrical signal into an optical signal and transmit the converted optical signal to a plurality of subscriber terminals.

The communication unit 320 can transmit a signal to the optical line terminal 100.

For example, when the communication unit 320 transmits a signal to the optical line terminal 100, the transmitted signal may be referred to as an upstream signal.

When the communication unit 320 transmits a signal to the optical line terminal 100, the communication unit 320 is allocated an uplink communication time slot from the optical line terminal and transmits a signal to the optical line terminal 100 during the allocated time slot.

For example, the signal transmitted by the communication unit 320 may include data. For example, data may be referred to as a source.

In the case of upstream communication in which the communication unit 320 transmits to the optical line terminal, the communication unit 320 can transmit a signal using a single wavelength. When multiple subscriber terminals transmit signals using a single wavelength, interference noise may occur between the signals. For example, interference noise occurring between signals may be referred to as one of OBI noise and the first interference noise.

In addition, the communication unit 320 performs a function of converting a baseband signal and a bit string according to a physical layer standard of the system.

For example, the communication unit 320 generates a complex symbol by encoding and modulating a transmission bit stream during data transmission in the communication unit 320.

In addition, the communication unit 320 demodulates and decodes the baseband signal upon receiving the data, and restores the received bit string through the decoding and demodulating of the received bit string.

Also, upon receiving the data, the communication unit 320 demodulates and decodes the baseband signal, and restores the received bit stream.

In addition, the communication unit 320 up-converts the baseband signal to an RF band signal, transmits the RF band signal through the antenna, and down-converts the RF band signal received through the antenna to a baseband signal.

For example, the communication unit 320 may include a transmission filter, a reception filter, an amplifier, a mixer, an oscillator, a DAC, an ADC, and the like.

In addition, the communication unit 320 may include different communication modules for processing signals of different frequency bands.

For example, different communication standards may include Bluetooth low energy, Wi-Fi, WiGig, cellular networks, and the like. Also, different frequency bands may include extreme shortwave (e.g., 2.5 GHz, 5 GHz) bands, mm bands (e.g., 60 GHz) bands.

The communication unit 320 is allocated a time slot through a downlink frame to support uplink communication from the optical line terminal.

For example, the communication unit 320 may receive a request of serial number from the optical line terminal, transmit the requested serial number to the optical line terminal, is allocated the identifier from the optical line terminal, and is registered in the optical line terminal.

The communication unit 320 according to an embodiment of the present invention may transmit a signal including two radio frequency tone signals to the optical line terminal.

When each of a plurality of subscriber terminals transmits signals including two radio frequency tone signals through a single wavelength, OBI noise may occur around the two radio frequency tone signals.

For example, the OBI noise generated around radio frequency tone signals may be referred to as resembling OBI noise.

The storage unit 340 stores data such as a basic program, an application program, and setting information for operating the subscriber terminal 120.

In particular, storage 340 may store at least one set of instructions (e.g., applications) for managing files in accordance with various embodiments. The storage unit 340 provides the stored data at the request of the control unit 360.

The storage unit 340 may include volatile and/or non-volatile memory. The storage unit 340 may store instructions or data related to at least one other component of the subscriber terminal 120.

The storage unit 340 stores data such as a basic program, an application program, and setting information for operating the subscriber terminal 120.

In particular, storage 340 may store at least one set of instructions (e.g., applications) for managing files in accordance with various embodiments.

At least one instruction set stored in the storage unit 340 may be executed by the control unit 360.

The storage unit 340 provides the stored data at the request of the control unit 360. The storage unit 340 is included in the subscriber terminal 120 and may be referred to as an 'internal storage' or an 'internal storage device'.

The control unit 360 can control the operations of the communication unit 320 and the storage unit 340.

The control unit 360 may include a processor, a central processing unit, an application processor, or a communication processor.

For example, the control unit 360 may perform operations and data processing related to control and/or communication of at least one other component of the subscriber terminal 120.

For example, the control unit 360 may control a plurality of hardware or software components connected to the control unit 360 by driving an operating system or an application program, and may perform various data processing and arithmetic operations.

For example, the controller 360 may be implemented as a system on chip (SOC). The control unit 360 may load into the volatile memory and process commands or data received from at least one of the other components (e.g., non-volatile memory) and store the resulting data in the non-volatile memory.

The control unit 360 may include at least one radio frequency tone signal in a signal transmitted to the optical line terminal through the communication unit 320 according to an exemplary embodiment of the present invention.

The control unit 360 according to an embodiment of the present invention can transmit a signal including at least one radio frequency tone signal to the optical line terminal through the communication unit 320.

The control unit 360 according to an embodiment of the present invention can determine the wavelength of a signal to be transmitted through the communication unit 320.

The control unit 360 may determine the transmission wavelength of the radio frequency tone signals included in the first signal transmitted through the communication unit 320 in consideration of the generating bandwidth of the second interference noise.

For example, the control unit 360 can predict the generating width of the second interference noise.

For example, the control unit 360 may determine the transmission wavelength of the radio frequency tone signals in consideration of a margin or a guard band of the second interference noise.

Figure 4:
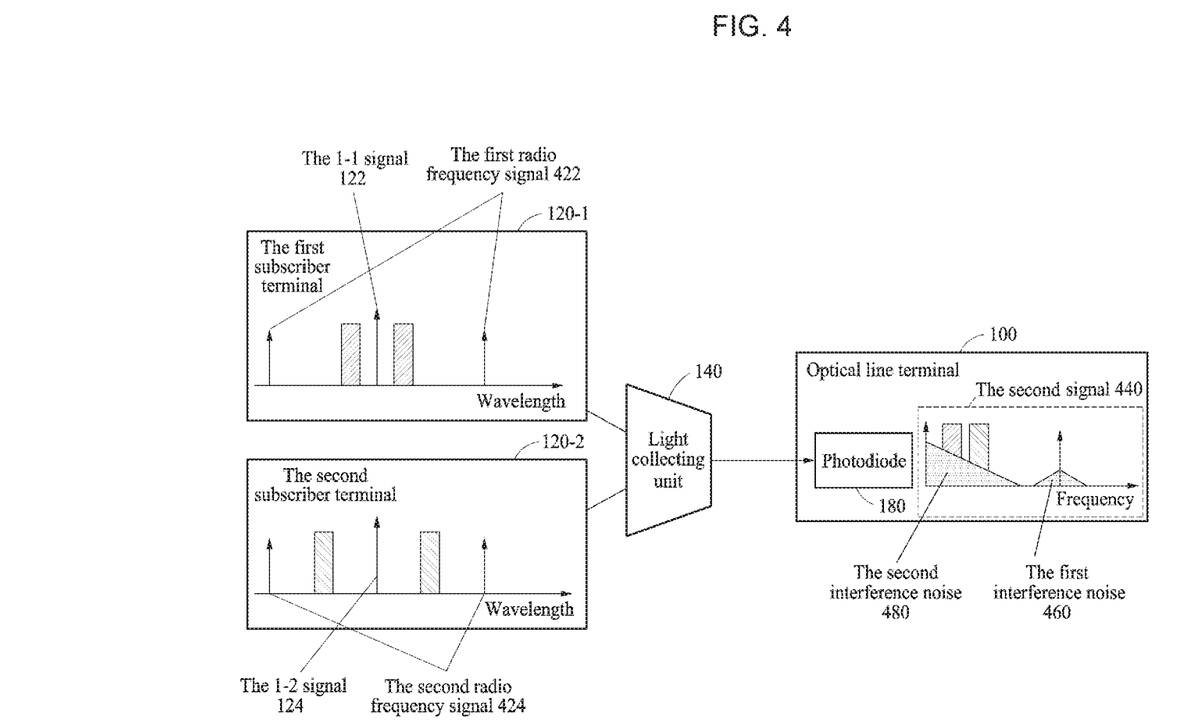
FIG. 4 illustrates a signaling procedure of signal transmission including a radio frequency tone signal in an optical communication system according to an embodiment of the present invention.

For example, the control unit 360 may control the subscriber terminal 120 to perform the procedure shown in FIG. 4.

FIG. 4 illustrates a signaling procedure involving a radio frequency tone signal in an optical communication system according to an embodiment of the present invention.

FIG. 4 shows an example in which, in the optical communication system, the optical line terminal 100 receives the first 1-1 signal 122 including the first radio frequency tone signals 422 from the first subscriber terminal 120-1, and receives the 1-2 signal 124 including the second radio frequency tone signals 424 from the second subscriber terminal 120-2.

The 1-1 signal 122 and the 1-2 signal 124 are transmitted from the first subscriber unit 120-1 and the second subscriber terminal 120-2 with a single wavelength having the same wavelength (100).

For example, the 1-1 signal 122 and the 1-2 signal 124 may be an optical carrier including data. For example, the first radio frequency tone signals 422 may be included on both sides of the 1-1 signal 122.

For example, the transmission wavelength of the first radio frequency tone signal 422 may be determined in consideration of the generating bandwidth of the second interference noise.

For example, the 1-1 signal 122 and the 1-2 signal 124 may include a baseband signal. For example, the optical line terminal 100 may receive the 1-1 signal 122 including the first radio frequency tone signals 422 from the first subscriber terminal 120-1.

For example, the first radio frequency tone signal 422 may be referred to as the first radio frequency tone.

The signal received from the first subscriber terminal 120-1 may include a reference optical signal. For example, the second radio frequency tone signal 424 may be referred to as the second radio frequency tone. The signal received from the second subscriber terminal 120-2 may include a reference optical signal.

The signals transmitted by the first subscriber terminal 120-1 and the second subscriber terminal 120-2 may include data.

Each of the first subscriber terminal 120-1 and the second subscriber terminal 120-2 transmits the 1-1 signal 122 including the first radio frequency tone signal 422 and the 1-2 signal 124 including a second radio frequency tone signal 424 at a single wavelength to the optical line terminal 100.

For example, the 1-1 signal 122 and the 1-2 signal 124 may be optical carrier including data.

For example, the signal transmitted by the first subscriber terminal 120-1 is transmitted on the optical carrier frequency and detected by the photodiode 180. The detected signal includes the 1-1 signal, data, and radio frequency tone signals.

The 1-1 signal 122 and the 1-2 signal 124 transmitted by the first subscriber terminal 120-1 and the second subscriber terminal 120-2 are combined by the light collecting unit 140, and converted into the second signal 440.

The second signal 440 may be detected through the photodiode 180 included in the optical line terminal 100.

For example, when the first subscriber terminal 120-1 and the second subscriber terminal 120-2 transmit an optical signal to the optical line terminal 100 using a carrier having the same wavelength and the second signal 440 is detected by the photodiode 180, a second interference noise 480 may be generated between the 1-1 signal 122 and the 1-2 signal 124. For example, the second interference noise 480 may be referred to as optical interference noise.

The optical line terminal 100 detects the second signal 440 combined by the light collecting unit 140 the 1-1 signal 122 and the 1-2 signal 124 transmitted from the first subscriber terminal 120-1 and the second subscriber terminal 120-2 via photodiode 180.

The photodiode 180 can detect the second signal 440 as a light signal and convert the detected light signal into an electrical signal. For example, the photodiode 180 may be referred to as a photo detector. For example, the photodiode 180 may detect data referred to as a photo detector. For example, the photodiode 180 may detect data contained in the 1-1 signal 122 and the 1-2 signal 124.

For example, when the first subscriber terminal 120-1 and the second subscriber terminal 120-2 transmit the 1-1 signal 122 and the 1-2 signal 124 to the optical line terminal 100, it can be referred to as uplink optical communication. For example, the 1-1 signal 122 may comprise a source. For example, the 1-2 signal 124 may comprise a source.

The composite signal of the 1-1 signal 122 and the 1-2 signal 124 received by the optical line terminal 100 may generate the second interference noise 480 as the signals received through a single wavelength.

The second interference noise 480 may be generated around the baseband of the 1-1 signal 122 and the 1-2 signal 124. For example, the second interference noise 480 may be referred to as OBI noise.

The first interference noise can be generated the around of the first radio frequency tone signals 422 included in the 1-1 signal 122 and the second radio frequency tone signal 424 included in the 1-2 signal 124 received by the optical line terminal 100.

For example, the first interference noise 424 may be referred to as a resembling OBI noise.

The optical line terminal 100 may extract the first interference noise 460 generated around the first radio frequency tone signal 422 and the second radio frequency tone signal 424.

The optical line terminal 100 can cancel the second interference signal generated in the baseband of the 1-1 signal 122 and the 1-2 signal 124 from the second signal 440 using the first interference noise 460 extracted at the around of the first radio frequency tone signal 422 and the second radio frequency tone signal 424.

For example, the second interference noise 480 generated in the baseband of the 1-1 signal 122 and the first interference noise 460 generated in the around of the first radio frequency tone signal 422 have the same nature.

For example, when the second interference noise 480 increases, the first interference noise 460 increases, and when the second interference noise 480 decreases, the first interference noise 460 decreases.

For example, the optical line terminal 100 may cancel the second interference noise by converting the frequency of the first interference noise and adjusting the power level.

The first interference noise 460 and the second interference noise 480 include overlapping characteristics.

For example, when the number of subscriber terminals that transmit optical signals to the optical line terminal 100 increases, the optical interference noises generated in the baseband of the optical signals transmitted by the subscriber terminals may be overlapped.

For example, optical interference noises generated around radio frequency tone signals included in optical signals transmitted by subscriber terminals may be overlapped.

Figure 5:
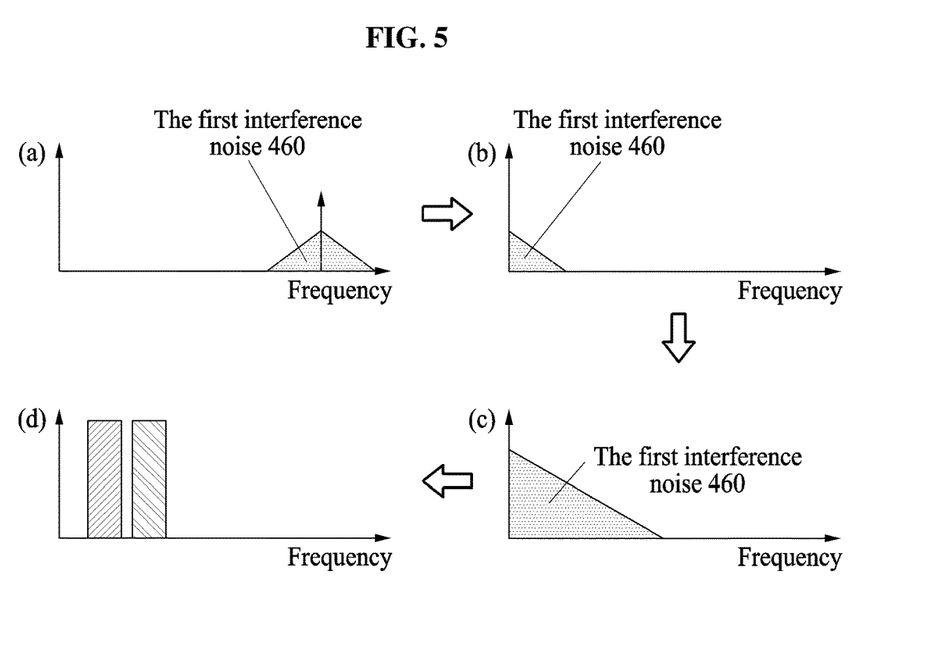
FIG. 5 illustrates a procedure of processing interference noise generated around a radio frequency tone signal according to an embodiment of the present invention.

FIG. 5 illustrates procedure for processing interference noise generated around a radio frequency tone signal according to an embodiment of the present invention.

Specifically, FIG. 5 illustrates an example of procedure in which, extracting a first interference noise from around of radio frequency tone signals included in a first signal received by an optical line terminal, and processing the first interference noise to cancel the second interference noise generated by the first signal using the extracted a first interference noise.

Referring to (a) of FIG. 5, the first interference noise 460 is generated around radio frequency tone signals included in signals received from subscriber terminals.

The optical line terminal extracts the first interference noise 460 generated around the radio frequency tone signals using a high pass filter (HPF).

The first interference noise 460 extracted by the optical line terminal has the same change characteristic as the second interference noise generated by the signals received from the subscriber terminals.

(b) of FIG. 5 shows the result of frequency down converting of the first interference noise 460. The optical line terminal performs a frequency down converting on the first interference noise 460 extracted around of the radio frequency tone signals The optical line terminal performs a frequency down converting to convert the received radio frequency tone signal into a baseband signal.

The optical line terminal generates a baseband signal corresponding to the difference between the frequencies of the two signals by merging the signal corresponding to the first interference noise 460 and the signal of the local oscillator using a down converter included in the mixer.

As the optical line terminal performs a frequency down converting, the first interference noise 460 is converted to the baseband signal.

(c) of FIG. 5 shows that the optical line terminal increases the power level of the signal corresponding to the frequency down-converted first interference noise 460.

The optical line terminal increases power by tuning the power of the signal corresponding to the frequency down-converted first interference noise 460.

For example, the optical line terminal adjusts the power of the signal corresponding to the frequency down-converted first interference noise 460 to be equal to the power of the signal corresponding to the interference noise generated in the baseband.

For example, the interference noise generated in the baseband may be referred to as the second interference noise.

(d) of FIG. 5 illustrates that the optical line terminal preforms the frequency down converting the signal corresponding to the first interference noise 460, adjusts the power of the signal corresponding to the first interference noise 460 to be equal the power corresponding to the second interference noise, cancels the second interference noise formed in the baseband of the first signal using the adjusted first interference noise 460, and thereby representing the data of the first signals in which the second interference noise is absent.

Figure 6:
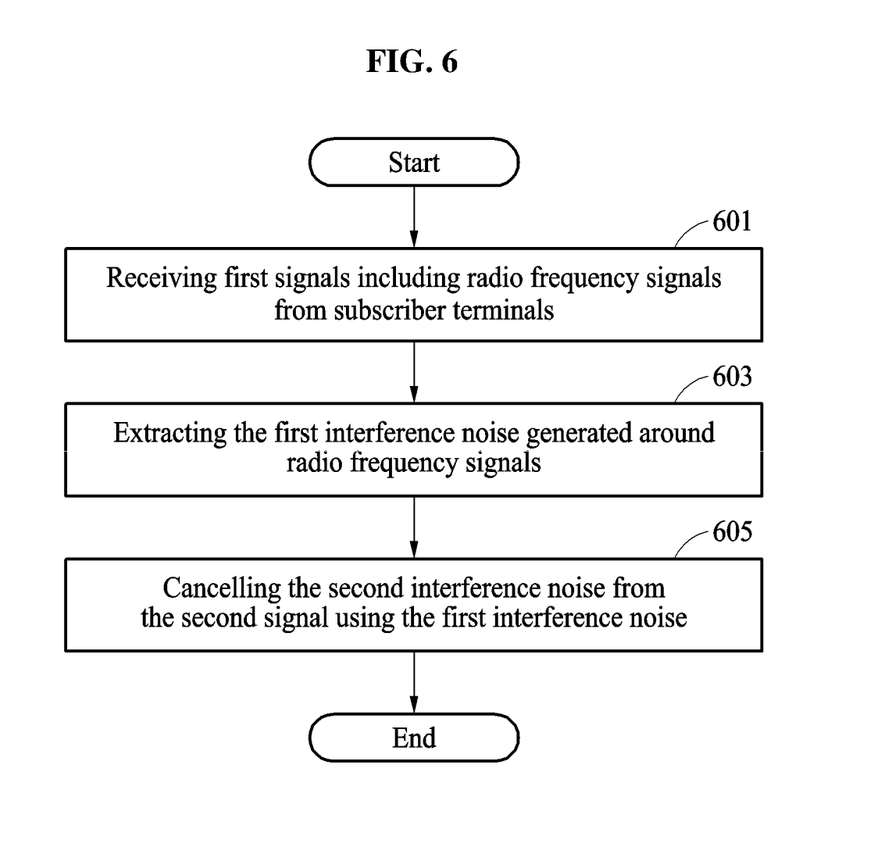
FIG. 6 illustrates an interference noise cancelling procedure of an optical line terminal according to an embodiment of the present invention.

For example, the optical line terminal performs a frequency down converting the signal corresponding to the first interference noise 460, adjusts the power of the signal corresponding to the first interference noise 460 to be equal the power corresponding to the second interference noise, cancels the second interference noise when signals corresponding to the adjusted first interference noise 460 cancels in the baseband of the first signal FIG. 6 illustrates an interference noise cancelling procedure of an optical line terminal according to an embodiment of the present invention.

Specifically, FIG. 6 illustrates a procedure for the optical line terminal to cancel the second interference noise generated in the baseband using the first interference noise.

Referring to FIG. 6 in step 601, the optical line terminal receives the first signals including radio frequency tone signals from subscriber terminals.

The optical line terminal receivers the first signals including a baseband signal and radio frequency tone signals from at least two or more subscriber terminal through a communication unit, detect the second signal by combining the first signals.

For example, the subscriber terminal may be referred to as a subscriber terminal. For example, when each of the two subscriber terminals transmits a signal over the same wavelength, each of the two subscriber terminals transmits as including two radio frequency tone signals to baseband signal transmitted.

The optical line terminal receives the second signal by combining through the light collecting unit the first signals transmitted by the subscriber terminals.

When the subscriber terminals transmit signals through the same wavelength, after the light collecting unit merges the signals, the signals of the subscriber terminals are transmitted to the optical line terminal.

The optical line terminal may receive a signal from the subscriber terminals via the photodiode and a second interference noise may be generated in the signal transmitted through the same wavelength.

Also, the first interference noise may be generated around the radio frequency tone signal included in the signal. For example, the first interference noise may be referred to as a resembling interference noise.

For example, the first signal transmitted by the subscriber unit and the radio frequencies included in the first signal include the same change characteristics.

For example, when the first signal is changed under the influence of the optical carrier frequency, the radio frequency included in the first signal are also changed under the influence of the optical carrier frequency.

In step 603, the optical line terminal extracts the first interference noise generated around the radio frequency tone signals.

The optical line terminal extracts the first interference noise around the radio frequency tone signals included in the signals transmitted by the subscriber terminals using a high pass filter.

The first interference noise extracted by the optical line terminal includes the same change characteristic as the second interference noise generated by the signal transmitted the subscriber terminals.

For example, the second interference noise may be generated around the baseband signal transmitted by the subscriber terminal.

For example, when the second interference noise changes under the influence of the optical carrier frequency, the first interference noise also changes under the influence of the optical carrier frequency.

In step 605, the optical line terminal cancels the second interference noise from the second signal using the first interference noise.

The optical line terminal extracts a first interference noise formed around the radio frequency tone signals from the signal received from the subscriber terminals, and cancels the second interference noise from the second signal using the first interference noise by modulating the signal corresponding to the exacted first interference noise and making similar change with the second interference noise.

For example, when the optical line terminal similarly modulates a signal corresponding to the first interference noise to a signal corresponding to the second interference noise and subtracts the modulated first interference noise from the second signal, the second interference noise can cancel from the second signal.

Figure 7:
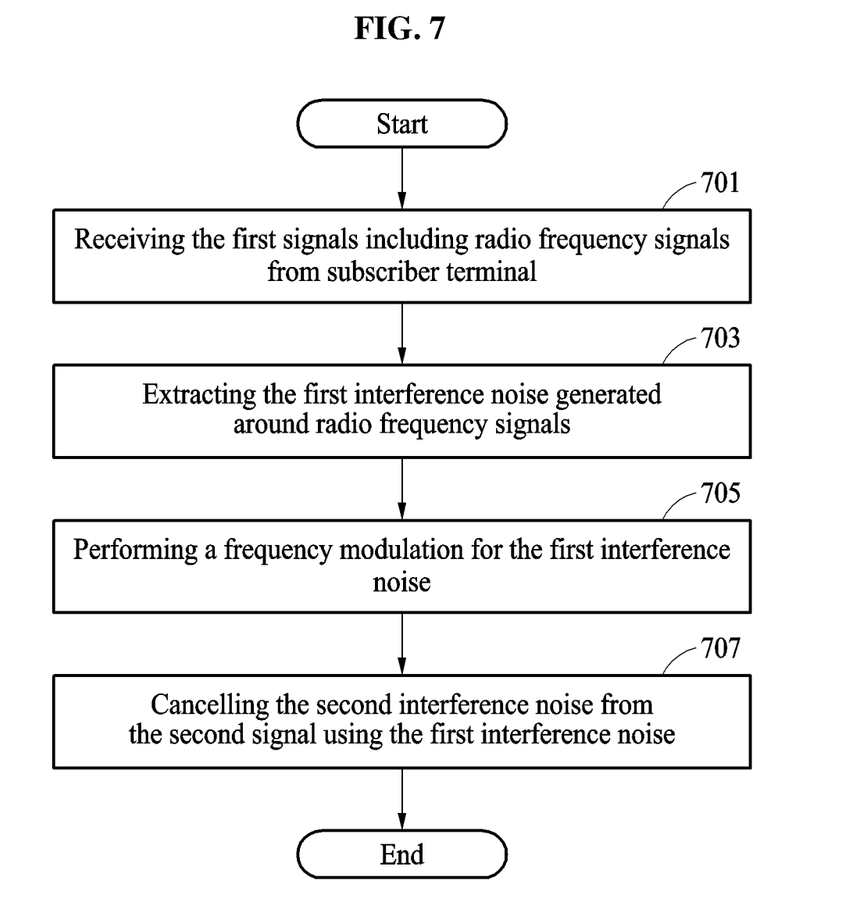
FIG. 7 illustrates a noise cancelling procedure of an optical line terminal according to another embodiment of the present invention.

FIG. 7 illustrates a noise canceling procedure of an optical line terminal according to another embodiment of the present invention.

Specifically, FIG. 7 illustrates an example of procedure in which the optical line terminal extracts interference noise generated around the radio frequency tone signals included in the signal transmitted by the subscriber unit, modulates the extracted interference noise, and cancels the second interference noise using the modulated interference noise.

Referring to FIG. 7, in step 701, the optical line terminal receives the first signals including baseband signals and radio frequency tone signals from subscriber terminals.

For example, the optical line terminal can receive the 1-1 signal transmitted by the first subscriber unit and the second signal combined the 1-2 signal transmitted by the second subscriber through the light collecting unit. For example, the 1-1 signal and the 1-2 signal may include a baseband signal.

Each of the 1-1 signal and the 1-2 signal includes two radio frequency tone signals. For example, the radio frequency tone signals included in the 1-1 signal include the same conversion characteristics as the baseband signals included in the 1-1 signal.

For example, the radio frequency tone signals included in the 1-2 signal include the same conversion characteristics as the baseband signals included in the 1-2 signal.

The baseband signal of the 1-1 signal and the radio frequency tone signals contained in the 1-1 signal are transmitted from the first subscriber unit to the optical line terminal through the same optical carrier frequency.

The baseband signal of the 1-1 signal and the radio frequency tone signals contained in the 1-1 signal change according to the change of the optical carrier frequency.

In step 703, the optical line terminal extracts a first interference noise generated around the radio frequency tone signals. The optical line terminal extract the first interference noise generated around the radio frequency tone signals using a high pass filter.

For example, after the radio frequency tone signals included in the first signal transmitted by the subscriber terminal are transmitted at the same wavelength as the radio frequency tone signals included in the first signal transmitted by the other subscriber terminal, the first interference noise is generated when it is detected by a photodiode in an optical line terminal.

The 1-1 signal and the 1-2 signal transmitted from the subscriber terminals generate a second interference noise. For example, the second interference noise may be generated around the baseband signal of the 1-1 signal and the 1-2 signal.

After the 1-1 and 1-2 signals are transmitted through the same wavelength from at least two subscriber terminals, the second interference noise is generated by combining the 1-1 signal and the 1-2 signal through light collecting unit, and by detecting through by the photodiode of the optical line terminal.

For example, since the first interference noise and the second interference noise are generated by the signals transmitted/received through the same optical carrier frequency, they have the same change characteristics.

In step 705, the optical line terminal performs frequency modulation for the first interference noise. The optical line terminal performs a frequency down converting on a signal corresponding to the first interference noise extracted from around the radio frequency tone signals.

As the signal corresponding to the first interference noise is frequency down-converted, it is converted with the frequency band in which the second interference noise generated around the baseband signal is located. The optical line terminal increases the power by tuning the power of the signal corresponding to the first down-converted frequency interference noise.

The signal corresponding to the first interference noise whose power is increased becomes the same power as the second interference noise.

The signal corresponding to the first interference noise subject to the frequency down converting and the power adjustment is similar to or the same as the signal corresponding to the second interference noise.

For example, the optical line terminal can adjust the power level of the signal corresponding to the first interference noise.

In step 707, the optical line terminal cancels the second interference noise from the second signal using the first interference noise. As the optical line terminal may cancel the first interference noise modulated similarly to the second interference noise from the second signal in step 705, the second interference noise can cancel from the second signal.

Figure 8:
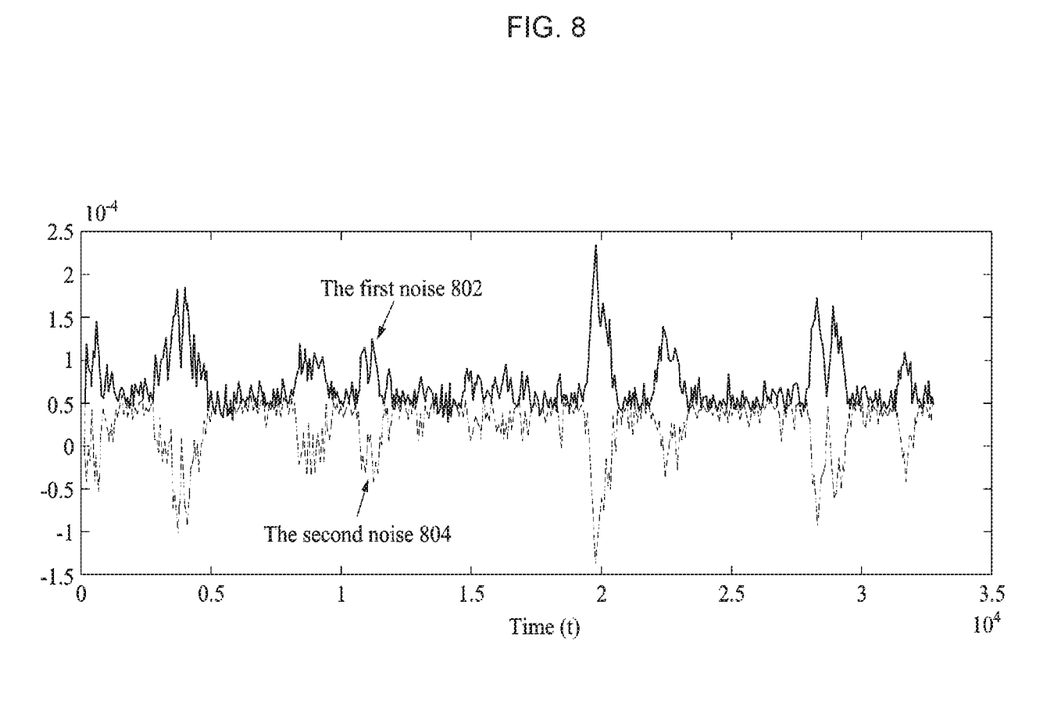
FIG. 8 illustrates a graph of noise in an optical communication system according to an embodiment of the present invention.

FIG. 8 illustrates a graph of noise in an optical communication system according to an embodiment of the present invention.

Specifically, FIG. 8 illustrates a simulating table where each of at least two subscriber terminals transmits first signals including a baseband signal and radio frequency tone signals to an optical line terminal, and when the optical line terminal receives the signals, the first noise 802 generated in the baseband signal and the second noise 804 generated in the around the baseband signal are measured.

FIG. 8, the horizontal axis represents time and the vertical axis represents the magnitude of the noise. FIG. 8 shows that the first noise 802 and the second noise 804 are identified at the same time.

According to FIG. 8, since the first noise 802 and the second noise 804 include same change characteristic, the first noise 802 and the second noise 804 include the same noise characteristic, it is possible to cancel the second noise 804 using the first noise 802.

For example, when the number of subscriber terminals increase, the first noise 802 and the second noise 804 are overlapped.

Therefore, even if the number of the subscriber terminals for transmitting signal increases, the optical line terminal can uniformly cancel the second noise 804 using the first noise 802.

For example, the first noise 802 may be referred to as the first interference noise or a resembling OBI noise and the second noise 804 may be referred to as the second interference noise or OBI noise.

The first interference noises according to an embodiment of the present invention are overlapped as the number of radio frequency tone signals included in the signals transmitted by the subscriber terminals increases.

The second interference noises according to an embodiment of the present invention are overlapped as the number of first signals transmitted by the subscriber terminals increases.

The optical line terminal according to an embodiment of the present invention can extract the first interference noise around the radio frequency tone signals.

The optical line terminal according to an embodiment of the present invention can uniformly cancel the second interference noise using the first interference noise regardless of the number of radio frequency tone signals and the number of signals transmitted by the subscriber terminals.

Methods according to the claims or the embodiments described in the specification may be implemented in hardware, software, or a combination of hardware and software.

Such software may be stored in a computer-readable storage medium. The computer-readable storage medium includes at least one program (software module), at least one program including instruction that cause the electronic device to implement the method of the present invention in case executed by the at least one processor in an electronic device.

Such software may store in the form of non-volatile storage such as volatile or read only memory (ROM), or in form of memory such as Random access memory, memory chip, device or integrated circuit memory chips, or in form of optical or magnetic readable medium such as Compact Disc-ROM, digital versatile disks (DVDs), magnetic disks, magnetic tape or the like.

The storage device and storage medium are embodiments of machine-readable storage means suitable for storing programs or programs, including instructions that, when executed, implement the embodiments.

Embodiments provide a program including code for implementing an apparatus or method as claimed in any one of the claims herein, and a machine-readable storage medium storing such a program.

Further, such programs may be electronically delivered by any medium, such as a communication signal carried over a wired or wireless connection, and the embodiments suitably include equivalents.

In the above-mentioned specific embodiments, elements included in the invention have been expressed singular or plural in accordance with the specific embodiments shown.

It should be understood, however, that the singular or plural representations are selected appropriately according to the situations presented for the convenience of description and that the above-described embodiments are not limited to the singular or plural constituent elements, while they may be composed of a plurality of elements even if they are represented by singular values, or while they may be composed of singular values even if they are represented by a plurality of elements.

While the invention has been shown and described with reference to certain preferred embodiments thereof, it will be understood by those skilled in the art that various changes and modifications may be made without departing from the spirit and scope of the invention as defined by the appended claims.

Therefore, the scope of the present invention should not be construed as being limited to the embodiments described, but should be determined by the equivalent scope of the appended claims, as well as the appended claims.

[Description of Symbols]

| | |
|---|---|
| 100: optical line terminal | 120: subscriber terminal |
| 140: light collecting unit | 180: photodiode |
| 220: communication unit | 240: storage unit |
| 260: control unit | 320: communication unit |
| 340: storage unit | 360: control unit |

What is claimed is:

1. An apparatus for cancelling interference noise in an optical communication system, comprising:
    a communication unit for receiving first signals including baseband signals and radio frequency tone signals from at least two subscriber terminals and for detecting a second signal in which the first signals are combined; and
    a control unit for extracting a first interference noise generated around the radio frequency tone signals from the second signal and for cancelling a second interference noise generated around the baseband signals using the first interference noise from the second signal.

2. The apparatus according to claim 1, wherein the first signals are received over the same wavelength from the at least two subscriber terminals.

3. The apparatus according to claim 1, wherein the transmission wavelength of the radio frequency tone signal is determined in consideration of a generated bandwidth of the second interference noise.

4. The apparatus according to claim 1, wherein the first interference noise is generated in case the radio frequency tone signals are transmitted at the same wavelength and combined by a light collecting unit; and
    wherein the second interference noise is generated in case the first signals are transmitted at the same wavelength and combined by the light collecting unit.

5. The apparatus according to claim 1, wherein one of first signals comprises two radio frequency tone signals.

6. The apparatus according to claim 1, wherein the first interference noises are overlapped as the number of radio frequency tone signals increases; and
    wherein the second interference noises are overlapped as the number of radio frequency tone signals increases.

7. The apparatus according to claim 6, wherein the control unit uniformly cancels the first interference noise and the second interference noise regardless of the number of the first signals and the number of the radio frequency tone signals.

8. The apparatus according to claim 1, wherein the control unit is to perform a frequency down-converting for the first interference noise, adjust a power level of the first down-converted frequency noise, and cancel the second interference noise from the second signal using the first interference noise adjusted the power level.

9. The apparatus according to claim 1, wherein the first signals are optical carriers; and wherein the second interference noise is generated in baseband of the optical carrier.

10. A method for cancelling interference noise in an optical communication system, comprising:
    receiving first signals including a baseband signal and radio frequency tone signals from at least two subscriber terminals and detecting a second signal in which the first signals are combined;
    extracting a first interference noise generated around the radio frequency tone signals from the second signal; and
    cancelling a second interference noise generated around baseband signals using the first interference noise from the second signal.

11. The method according to claim 10, wherein the first signals are received over the same wavelength from the at least two subscriber terminals.

12. The method according to claim 10, wherein the transmission wavelength of the radio frequency tone signal is determined in consideration of a generated bandwidth of the second interference noise.

13. The method according to claim 10, wherein the first interference noise is generated in case the radio frequency tone signals are transmitted at the same wavelength and combined by a light collecting unit; and
    wherein the second interference noise is generated in case the first signals are transmitted at the same wavelength and combined by the light collecting unit.

14. The method according to claim 10, wherein the transmission wavelength of the radio frequency tone signal is determined in consideration of the generated bandwidth of the second interference noise.

15. The method according to claim 10, wherein one of first signals comprises two radio frequency tone signals.

16. The method according to claim 10, wherein the first interference noises are overlapped as the number of radio frequency tone signals increases; and wherein the second interference noises are overlapped as the number of radio frequency tone signals increases.

17. The method according to claim 10, wherein the step of cancelling the second interference noise comprises uniformly cancelling the second interference noise using the first interference noise regardless of the number of the first signals and the number of the radio frequency tone signals.

18. The method according to claim 10, wherein the step of cancelling the second interference noise further comprising: performing a frequency down-converting for the first interference noise; adjusting a power level of the first interference noise; and cancelling the second interference noise from the second signal using the first interference noise.

19. The method according to claim 10, wherein the first signals are optical carriers; and wherein the second interference noise is generated in baseband of the optical carrier.

* * * * *